United States Patent [19]

Chatsick et al.

[11] Patent Number: 4,985,102

[45] Date of Patent: Jan. 15, 1991

[54] METHOD OF MAKING FIBER REINFORCED POLYAMIDE SHEETS

[75] Inventors: James J. Chatsick, Port Hope; Peter A. Sipos, Kingston, both of Canada

[73] Assignee: Du Pont Canada Inc., Mississauga, Canada

[21] Appl. No.: 506,148

[22] Filed: Apr. 9, 1990

Related U.S. Application Data

[63] Continuation of Ser. No. 73,476, Jul. 15, 1987, abandoned.

[51] Int. Cl.$^5$ ............................................. B29D 9/00
[52] U.S. Cl. ................................... 156/163; 156/62.2; 156/176; 156/324; 428/293; 428/475.2; 428/475.5; 428/479.3; 524/413; 524/606
[58] Field of Search ................ 524/413, 606; 428/293, 428/475.2, 475.5, 479.3; 156/62.2, 324, 163, 176

[56] References Cited

U.S. PATENT DOCUMENTS

| | | | |
|---|---|---|---|
| 2,705,227 | 3/1955 | Stamatoff | 524/706 |
| 3,738,949 | 6/1973 | Schonberg | 524/606 |
| 4,362,585 | 12/1982 | Antonis | 156/324 |

FOREIGN PATENT DOCUMENTS 1249734 12/1982 France .

*Primary Examiner*—Veronica P. Hoke

[57] ABSTRACT

An oriented nylon film, useful as a carrier web in the manufacture of fibrous reinforced resin sheets, is disclosed. Oriented nylon film containing a salt selected from at least one copper salt, at least one alkali metal halide, at least one alkaline earth metal halide or mixtures thereof is disclosed. The nylon film is preferably nylon 6, nylon 66, nylon 66/6 and/or mixtures thereof and the salt is preferably a copper salt, especially cupric acetate or cupric iodide, or potassium bromide.

11 Claims, No Drawings

METHOD OF MAKING FIBER REINFORCED POLYAMIDE SHEETS

This application is a continuation of application Ser. No. 07/073,476 filed July 15, 1987, now abandoned.

The present invention relates to nylon film, which is useful as a carrier web in the manufacture of fibrous reinforced resin sheets.

Fibrous reinforced resin sheets, which are also known as reinforced panels (FRP) and methods of manufacturing them are known. Fibrous reinforced resin sheets are generally made from a cross-linkable polymeric resin containing a particulate filler. The polymeric resin is usually a cut fibre, such as glass fibre. The sheets may also contain small concentrations of additives, e.g., a cross-linking agent. A typical method of manufacture is described in U.S. Pat. No. 4 362 585 to de Antonis et al which issued 1982 Dec. 7, and in French Pat. No. 1 249 734 to Deutsche Akadamie der Wissenschaften zu Berlin which was published 1960 Nov. 21. Carrier webs shown to be useful in this method of manufacture include regenerated cellulose film, oriented polyester film and oriented nylon film. The top film also may be made from these materials.

In the manufacture of fibrous reinforced resin sheets, it is critical, for some applications, that such sheets have glossy surfaces. For example, if the surface of sheets intended for building greenhouses is rough, mould tends to grow on the sheets. In addition, if fibres extend from the surface, such sheets tend to have a shorter useful life than sheets which do not have fibres extending from the surface. When regenerated cellulose film is used as the web in contact with the reinforced resin sheet, during manufacture, the sheets so formed have a glossy surface which make such sheets suitable for use in greenhouses and the like. Heretofore, when oriented nylon films have been used as a carrier or top web in the manufacture of fibrous reinforced resin sheets, the resultant sheets are lacking in the necessary gloss characteristics for some applications. In order to overcome such a problem, it is common to use an additional processing treatment, known as "gel coat" in order to impart the necessary high gloss finish. Fibrous sheets made with regenerated cellulose and nylon carrier webs have been studied microscopically, and it has been found that a sheet made using an oriented nylon carrier web has fibres which stick out from the surface of the sheet, thus causing the lack of gloss.

Although not wishing to be bound by any theory, the present inventor speculates that the aforementioned problem of lack of gloss may be caused by static electricity at the interface of the oriented nylon film and the resin sheet. It has been observed that during manufacture of cast nylon films there is less static build-up on films containing a heat stabilizer than on those in which the heat stabilizer is not present.

Heat stabilizers, for use in nylon structures, are known. In general, heat stabilizers comprising cupric salts and alkali metal salts, in combination, are used commercially. They are used in nylon fibres which may be subject to heat and/or strong sunlight, e.g., seat belt yarn. In addition, they have been used in cast nylon film which are intended to be subjected to high temperatures, e.g., in the manufacture of aeroplane wings. It is believed that heretofore there has been no use of oriented nylon films containing heat stabilizers.

Accordingly, the present invention provides an oriented nylon film containing an additive selected from at least one copper salt, at least one alkali metal halide, at least one alkaline earth metal halide and mixtures thereof.

Preferably the nylon film is nylon 6, nylon 66 or nylon 66/6 film, or a film of a mixture of nylon 6, nylon 66, and/or nylon 66/6. Especially useful is nylon 66 film. The film is preferably oriented in the machine direction.

Preferred copper salts are cupric acetate and cupric iodide, especially the former. It is preferred that the copper salt, alkali metal halide or alkaline earth metal halide be used alone, but they may be used in combination.

The present invention also provides a method of manufacturing fibrous reinforced resin sheet, wherein the material of such sheet is fed into a carrier web, the improvement comprising the carrier web being an oriented nylon film containing an additive selected from at least one copper salt, at least one alkali metal halide, alkaline earth metal halide and mixtures thereof.

In an embodiment, a top web is fed on top of such material prior to passing the resultant sandwich of carrier web, fibrous reinforced resin material and top web through constricting rollers, wherein the top web is an oriented nylon film.

Preferably the nylon film is made from nylon 6, nylon 66, nylon 66/6 or mixtures thereof, especially nylon 66 film. Preferably, also, the film is oriented in the machine direction. The top web and carrier web may both be the nylon film of the present invention.

The present invention also provides a method of manufacturing fibrous reinforced resin sheet wherein the material for such sheet is fed onto a carrier web, a top web is fed onto the top of the material and the resulting sandwich of top web, material and carrier web is passed through constricting means for controlling the thickness and shape of the transverse section of the sandwich, the improvement wherein at least one of the top web and carrier web is an oriented nylon film containing an additive selected from at least one copper salt, at least one alkali metal halide, at least one alkaline earth metal halide and mixtures thereof.

The copper salts may be cupric or cuprous salts of an organic or an inorganic acid. Preferred organic acid salts are copper salts of acetic, butyric, lauric, palmitic and stearate acids. Preferred alkali metal and alkaline earth metal halides are the chlorides, bromides or iodides of sodium, potassium and magnesium.

The nylon film may be oriented using known methods, e.g. according to the methods shown in Canadian Patent No. 1 011 520 to I. K. MacGregor which issued 1977 June 7 and U.S. Pat. No. 4 477 407 to Hetherington et al which issued 1984 Oct. 10. Preferred orientation ratios are from 1.5:1 to 6:1.

For the manufacture of fibrous reinforced resin sheets, usually a carrier web is continuously fed onto a conveyor, past stations for feeding cross-linkable resin and particulate filler onto the carrier web, through an oven and is then wound up on a wind-up roll. The carrier web is a so-called release sheet and may be of regenerated cellulose, oriented polyester or oriented nylon film. A top web, also a release sheet, may also be fed on top of the filler and resin prior to entering the oven. Prior to entering the oven, there is means to control the thickness of the resin and filler mixture. Usually this is accomplished by the use of compacting rollers. In the present invention, at least one of the carrier web and top web is an oriented nylon film containing the aforementioned copper and/or halide salts.

The cross-linkable resin is usually a thermosetting resin, e.g. a polyester composition containing a cross-linking agent. The particulate filler is a fibrous reinforcing material, e.g. cut fibre. The usual fibrous reinforcing material is cut glass fibre. After compaction, the resin sheet is fed into an oven where cross-linking takes place. The crosslinked sheet is then removed from the oven. Usually the carrier web, and any top web is stripped from the sheet at this stage, but such webs may remain in contact with the sheet until used. The crosslinked sheet is cut into sheets of appropriate length.

The sheet formed using the present invention are useful in applications where a glossy surface is desirable.

The present invention is illustrated by the following example:

EXAMPLE 1

Six experiments were performed whereby fibrous-reinforced resin sheets were manufactured using carrier webs of regenerated cellulose film, machine-direction oriented nylon 6 or nylon 66 films (without copper salts) and nylon 66 films containing copper salts in amounts of about 12, 43, and 75 ppm Cu. The process was run at about 10 m/min and the resin sheets cured at about 125° C.

The sheets produced using the regenerated cellulose film and the copper-containing nylon film carrier webs were acceptable for greenhouse glazing applications, but the sheets produced with other films were unacceptable.

EXAMPLE 2

Several experiments were performed whereby fibrous reinforced resin sheets were manufactured using carrier webs as shown in Table 1. The manufacturing processes were run at about 10 m/min and the resin sheets were cured at about 155°-160° C.

TABLE 1

| Run No. | Carrier Web | Additive | Gloss* |
|---|---|---|---|
| 1 | Nylon 6 | None | 3 |
| 1A | Nylon 6 | None | 3 |
| 24 | Nylon 66 | None | 3 |
| 12 | Nylon 6 | None | 7** |
| 5 | Nylon 66 | Cupric acetate (44 ppm Cu) | 8 |
| 6 | Nylon 66 | Cupric acetate (60 ppm Cu) | 8 |
| 7 | Nylon 66 | Cupric acetate (120 ppm Cu) | 9 |
| 8 | Nylon 66 | Cuprous iodide (30 ppm Cu) | 9 |
| 9 | Nylon 66 | Cuprous iodide (70 ppm Cu) | 9 |
| 10 | Nylon 66 | Cuprous iodide (135 ppm Cu) | 9 |
| 2,14-22 | Nylon 66 | Cupric acetate (25 ppm Cu) and Potassium bromide (710 ppm) | 7[1] |
| 3,23 | Nylon 66 | Cupric acetate (64 ppm Cu) and Potassium bromide (1800 ppm) | 8[1] |
| 11 | Nylon 6 | Cupric acetate (70 ppm Cu) and Potassium bromide (2000 ppm) | 7 |
| 4 | Nylon 66 | Potassium bromide (940 ppm) | 8 |
| 13 | Regenerated cellulose | — | 7 |

*Subjective rating, 1 to 10 (matte to high gloss)
**Finished sheet was gel coated
[1]Average gloss level for all runs.

All of the nylon carrier webs had a thickness of 19 micrometers, whereas the regenerated cellulose carrier web had a thickness of 215 micrometers.

For runa 1, 1A and 24, examination of the sheet surface showed fibre prominence. For runs 2 to 13 and 15 to 23, no such fibre prominence was evident.

The copper salt may be present in the oriented nylon film in concentrations as small as about 10 ppm, based upon the copper concentration. Concentrations from 20 to 150 ppm Cu are particularly effective, especially from at least 50 ppm. The halides of the alkali metal or alkaline earth metal may preferably be in concentrations from about 0.05 wt %, especially from about 0.08 to 0.20 wt %.

For the manufacture of fibrous reinforced resin sheet, the oriented nylon film thickness will depend, in part on the thickness of the sheet. For so-called heavy gauge resin sheet the nylon film may be up to about 60 micrometers or greater in thickness.

We claim:

1. A method for manufacturing fibrous reinforced resin sheet wherein either (a) the material for such sheet is fed onto a carrier web of an oriented film, or (b) the material for such sheet is fed onto a carrier web, a top web is fed onto the top of the material and the resulting sandwich of top web, material and carrier web is passed through constricting means for controlling the thickness and shape of the transverse section of the sandwich, and wherein at least one of the top web and carrier web is an oriented nylon film; the improvement wherein the nylon film contains an additive selected from at least one copper salt, at least one alkali metal salt, at least one alkaline earth metal salt and mixtures thereof.

2. A method according to claim 1 wherein the nylon is nylon 6, nylon 66, nylon 66/6 or mixtures thereof.

3. A method according to claim 2 wherein the nylon film is monoaxially oriented.

4. A method according to claim 3 wherein the additive is selected from acetates, butyrates, laurates, palmitates, stearates and iodides of copper.

5. A method according to claim 4 wherein the additive is selected from acetates, butyrates, laurates, palmitates, stearates, and iodides of copper.

6. A method according to claim 4 wherein the additive is present in a concentration of at least 10 ppm Cu.

7. A method according to claim 6 wherein the additive is present in a concentration of from 20 to 150 ppm Cu.

8. A method according to claim 3 wherein the additive is selected from iodides, bromides and chlorides of sodium, potassium and magnesium.

9. A method according to claim 8 wherein the additive is potassium bromide.

10. A method according to claim 8 wherein the additive is present in a concentration of at least 0.05 wt %.

11. A method according to claim 9 wherein the additive is present in a concentration of at least 0.05 wt. %.

* * * * *